Aug. 4, 1942.   E. C. STRONG   2,292,304
CHANGE SPEED MECHANISM
Filed July 11, 1941   3 Sheets-Sheet 1
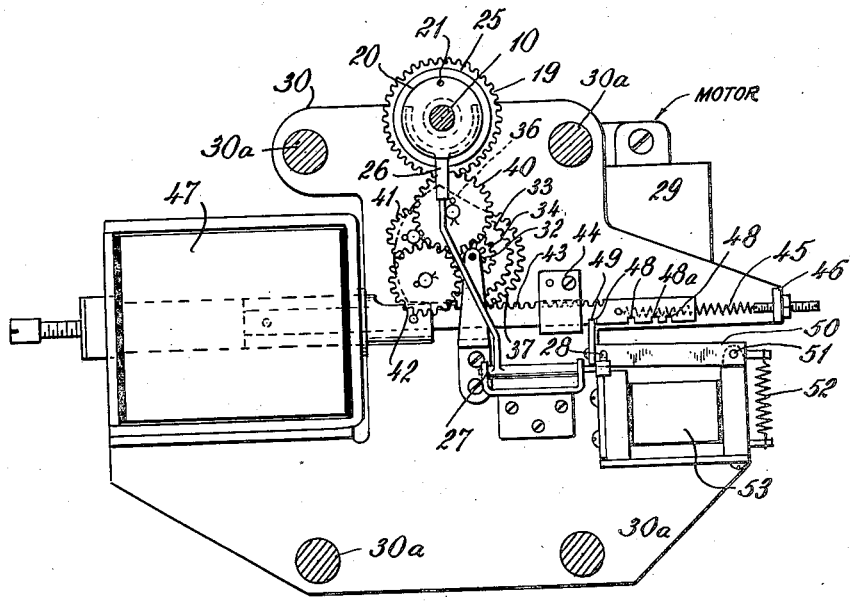
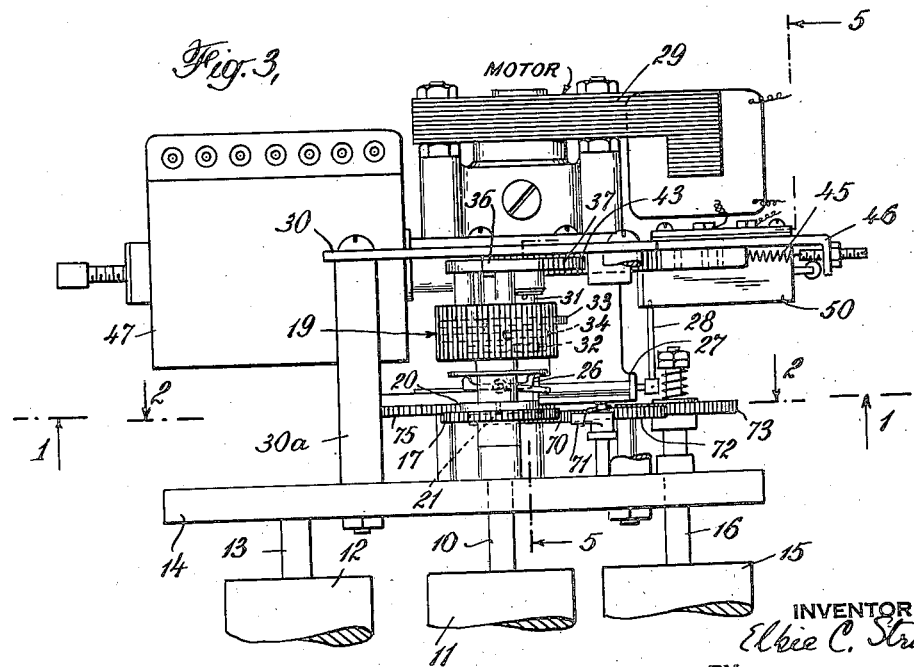
INVENTOR
Elbie C. Strong
BY
ATTORNEYS Aug. 4, 1942. E. C. STRONG 2,292,304
CHANGE SPEED MECHANISM
Filed July 11, 1941 3 Sheets-Sheet 2
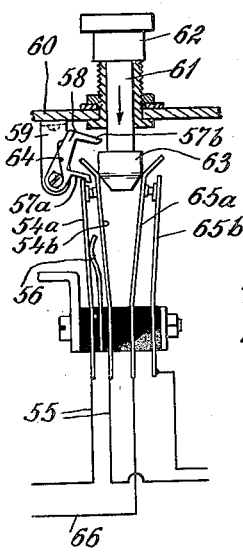
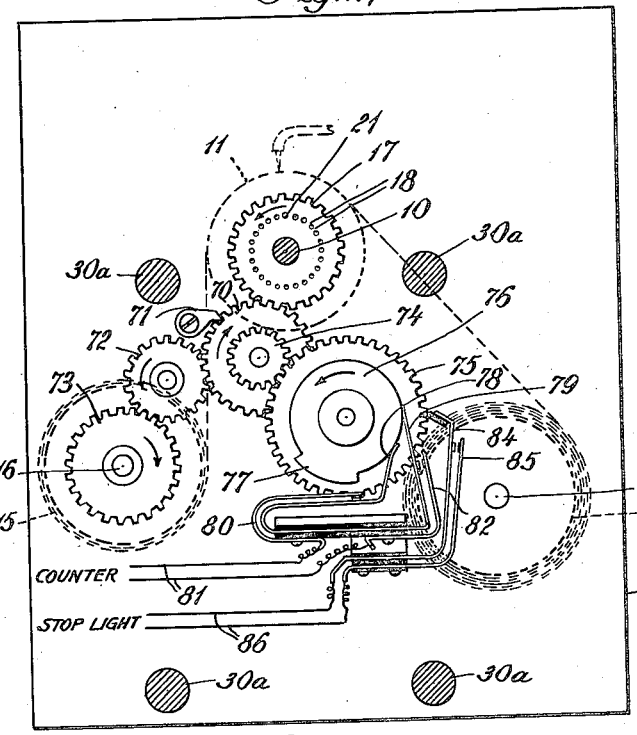
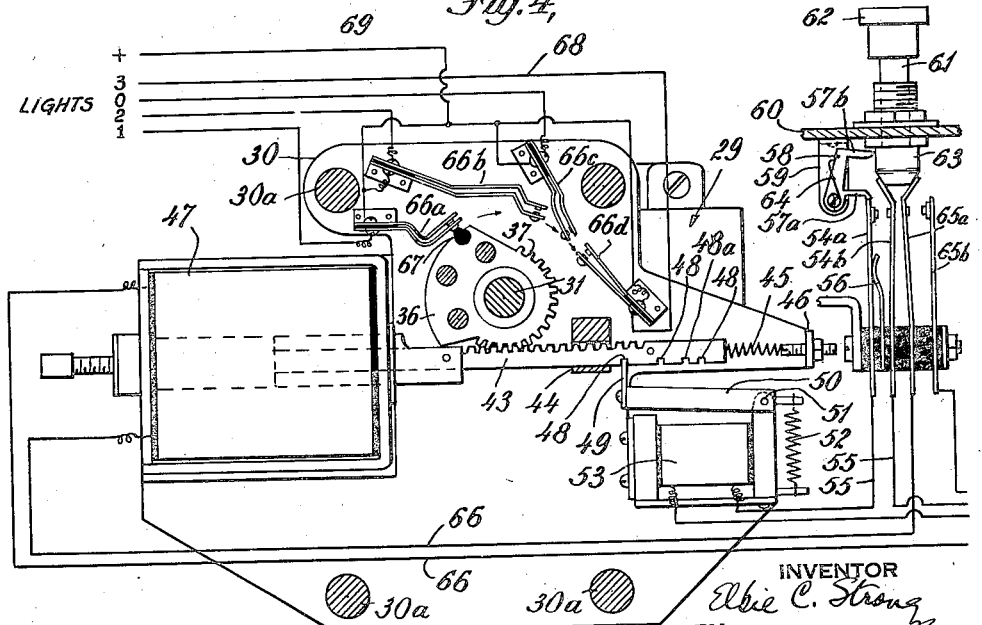
INVENTOR
Elbie C. Strong
BY
Pennie Davis Marvin Edmonds
ATTORNEYS Aug. 4, 1942.    E. C. STRONG    2,292,304
CHANGE SPEED MECHANISM
Filed July 11, 1941    3 Sheets-Sheet 3
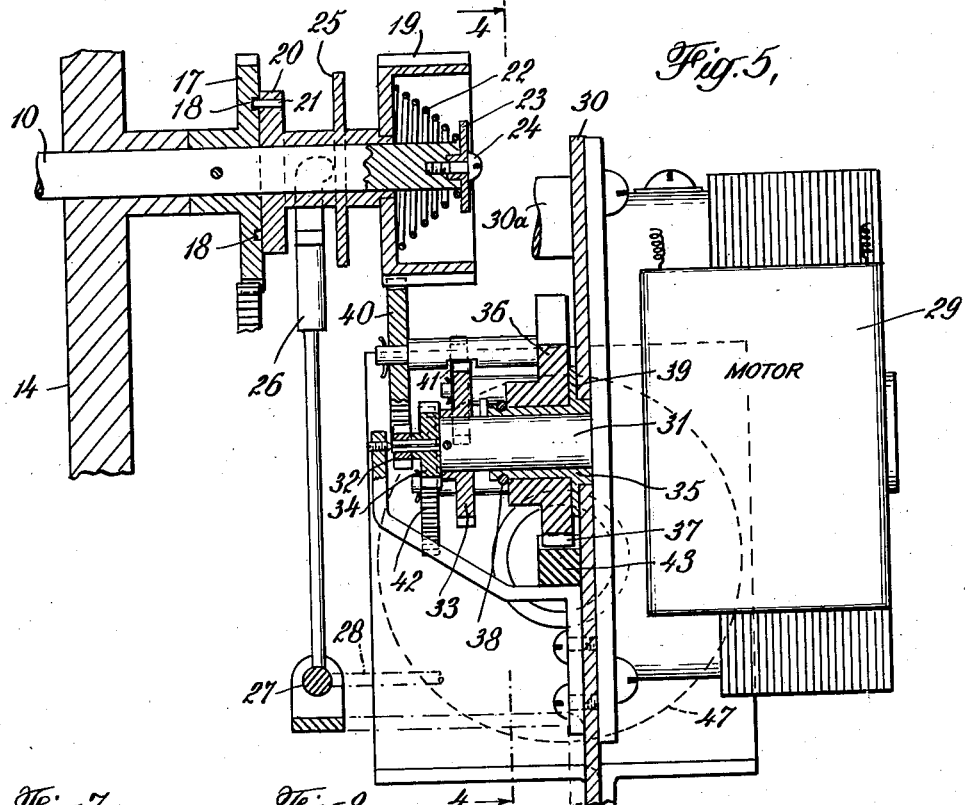
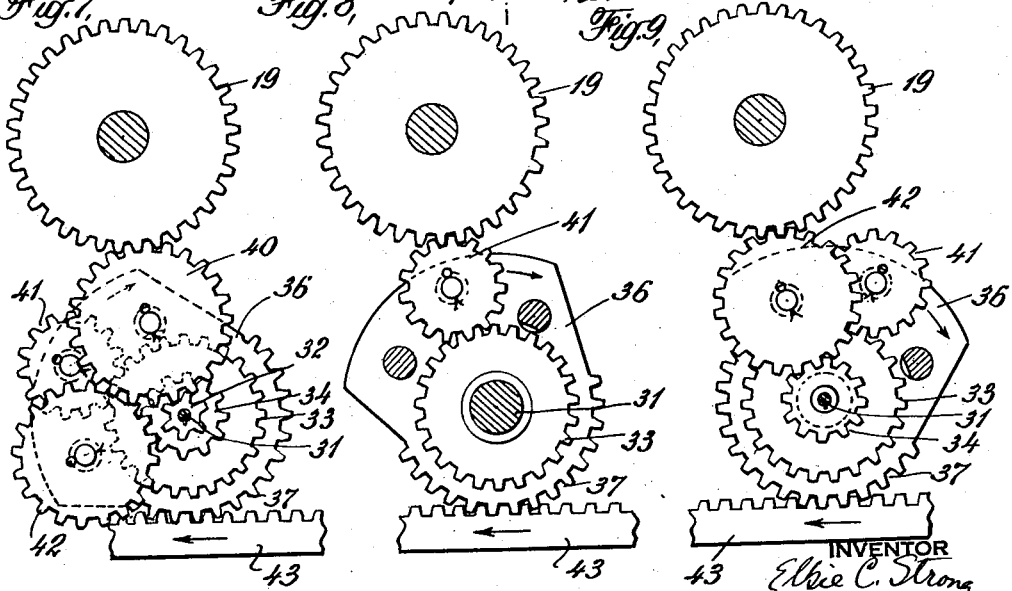
INVENTOR
Elbie C. Strong
BY
Pennie Davis Marvin Edwards
ATTORNEYS Patented Aug. 4, 1942

2,292,304

UNITED STATES PATENT OFFICE 2,292,304

CHANGE SPEED MECHANISM

Elbie C. Strong, Long Island City, N. Y., assignor to Waugh Equipment Company, New York, N. Y., a corporation of Maine Application July 11, 1941, Serial No. 401,885

12 Claims. (Cl. 74—354)

This invention relates to change speed mechanisms used as a connection between a driver and a driven member and operable selectively to vary the speed at which the driven member is run. More particularly, the invention is concerned with a novel change speed mechanism which is of simple construction and is capable of remote control.

The change speed mechanism of the invention may be made of various sizes and forms for various purposes, and it may be used to particular advantage in connection with recording instruments in which a continuous record is made on a tape or record sheet which is to be driven at different speeds, depending on the character of the record desired. A form of the new change speed mechanism suitable for use with such an instrument will, accordingly, be illustrated and described in detail for purposes of explanation, although it will be evident that the utility of the new mechanism is not limited to that specific application.

In certain recording instruments, such, for example, as those used for making a continuous record of the vibrations in different directions of the body of a moving railway car, the record is made by pens moved in response to the vibrations and inscribing lines on a record sheet passed at a regular rate beneath the pens. For some purposes, the sheet may be driven at the rate of 3" per minute, while for others, it is desirable to move the sheet at different rates, such as 6" or 12" per minute, to produce records which are stretched out and easier to examine in detail. The instruments of the type mentioned, with which I am familiar, include either a spring motor or an electric motor which is geared to a shaft connected to the take-up roll of the instrument and, if a change in the rate of travel of the record sheet is desired, the motor must be stopped, the driving and driven gears removed, and others substituted for them. During such operations, recording is stopped and, accordingly, changing the speed of the record sheet is not only inconvenient but is further objectionable in that it results in the instrument being out of action for a considerable period of time.

The present invention is directed to the provision of a change speed mechanism which is particularly suitable for use with recording instruments of the type referred to since the mechanism enables the operator to change the rate of travel of the record sheet almost instantly and from a remote point. When employed with such an instrument, the apparatus may include means for indicating at the control station whether or not the sheet is advancing and the rate of its movement, and means for indicating, as by a counter, the total length of the sheet that is available for further use may also be provided.

For a better understanding of the invention, reference may be had to the accompanying drawings in which Fig. 1 is a sectional view of the apparatus on the line 1—1 of Fig. 3;

Fig. 2 is a sectional view on the line 2—2 of Fig. 3;

Fig. 3 is a plan view of the apparatus;

Fig. 4 is a sectional view on the line 4—4 of Fig. 5, with certain circuits illustrated diagrammatically and a control switch shown in side elevation;

Fig. 5 is a sectional view on the line 5—5 of Fig. 3;

Fig. 6 is a view, partly in elevation and partly in section, illustrating the operation of a switch shown in Fig. 4; and Figs. 7, 8, and 9 are transverse sectional views illustrating operating parts of the mechanism in different positions.

In the drawings, the apparatus is illustrated as used for driving the shaft 10 of the roll 11 which advances the record sheet in a recording instrument. The sheet is supplied from a roll 12 on a spindle 13 journaled in the wall 14 of the instrument, and is drawn off the supply roll by advancing roll 11 and wound on a take-up drum 15 mounted on a shaft 16. The shafts 10 and 16 are mounted for rotation in bearings in the wall 14 and extend through the wall.

Fast on shaft 10 is a gear 17 which drives other gears presently to be described, the outer face of gear 17 having a circular row of openings 18. A wide face gear 19 is loosely mounted on shaft 10 and it is provided with a hub having an end flange 20 carrying a pin 21. The pin is receivable in any of the openings 18 and, when in place in such an opening, connects gear 19 through gear 17 to the shaft 10. A spring 22 encircling the shaft and lying within gear 19 bears at one end against one face of the gear and at the other end against a washer 23 held in place on the end of the shaft by a screw 24. The spring tends to move gear 19 along the shaft toward gear 17, so that the pin 21 will enter an opening 18. The hub of gear 19 is provided with a circumferential flange 25 spaced from flange 20 and the ends of a fork 26 lie between the flanges. The fork is pivotally mounted at 27 on a suitable bracket and has a crank 28 which may be operated to swing the fork to move gear 19 and its hub against the action of spring 22 to remove pin 21 from the opening in which it has been received. When the gear and hub are in this position, the gear is loose on shaft 10.

The mechanism by which gear 19 is driven includes a prime mover 29 which may be either a spring or electric motor. As illustrated, the motor 29 is an electric motor supplied with current from any suitable source. The motor is mounted on an upright plate 30 secured to wall 14 by posts 30a and the shaft 31 of the motor extends through the plate. Fast on the shaft near its end are three gears 32, 33, and 34 of successively increasing numbers of teeth and loosely mounted on a bushing 35 on the shaft is a carrier plate 36, which is provided with a gear segment 37 along a portion of its edge. The plate is held in place, as by a key ring 38, against a flange 39 on the bushing. Three gears 40, 41, and 42 are mounted on studs on the plate and these gears are in mesh with the gears 32, 33, and 34 and continuously driven thereby while shaft 31 is rotated by the motor.

A rack 43 having teeth meshing with teeth 37 on the carrier plate is mounted for endwise movement in a suitable support 44 on plate 30 and a spring 45 secured at one end to one end of the rack and at the other end to a bracket 46 on plate 30 tends to hold the rack in one position. The other end of the rack extends into a solenoid 47, which may be energized to move the rack against the force of spring 45. A plurality of notches 48 are formed in the lower edge of the rack and a locking plate 49 may enter any of the notches and hold the rack against movement in either direction. The plate 49 is mounted on the end of a bar 50, pivoted at 51 and acted on by a spring 52 to swing it, so that the plate 49 will enter the notches 48. The bar 50 is the armature of an electromagnet 53 which, when energized, attracts the armature to withdraw the plate 49 from the notch in which it has been received.

The holding electromagnet 53 and the actuating solenoid 47 are opened by the switch shown at the right in Fig. 4 and also in Fig. 6. The switch includes spring arms 54a and 54b carrying contacts which, when closed, establish a circuit through lines 55 to the holding electromagnet, causing it to be energized to attract its armature and thus removing the locking plate 49 from a notch 48. The arm 54a is urged away from arm 54b by a spring 56 and is also acted on by one arm 57a of a lever 58 pivotally mounted on a bracket 59 extending downward from a plate 60 through which extends the spindle 61 by which the switch is operated. The spindle carries a button 62 at its upper end and a head 63 at its lower end, the head having a beveled lower edge engageable with the upper inclined arm 54b. A spring 64 acts on the lever and tends to move it in a clockwise direction.

The construction is such that, when the spindle 61 is in its uppermost position and arms 54a, 54b in their normal vertical positions, the hooked outer end of the arm 57a rests on the top of arm 54a and the end of upper arm 57b of the lever lies close to the cylindrical surface of the head 63. When the spindle is fully depressed, the head 63 first moves the arm 54a outwardly until the contact thereon engages the contact on arm 54a and then causes the end of arm 54b to slip out from beneath the end of the arm 57a of lever 58, the upper arm 57b of the lever at the same time passing over the top of the head. When the button 62 is released and the spindle moves upwardly, the arm 54b first moves away from arm 54a to open the contacts and, during this movement, arm 54a is held in its outer position by the hooked end of arm 57a on the lever 58. Arm 54a is held in this position by the lever arm until the head 63 engages the upper lever arm 57b and sings the lever counterclockwise to release contact arm 54a. The arm 54a then starts to move inward toward arm 54b, but the contacts on the arms 54a, 54b are kept from engagement by the spring 56 acting on arm 54a.

The switch also includes arms 65a and 65b, carrying contacts which, when closed, establish a circuit through lines 66 through which current is supplied to the actuating solenoid 47. The arm 65a has a sloping upper end engageable by the beveled edge of the head 63 on the spindle 61 and the arrangement of the arms 54a, 54b and 65a, 65b is such that on the depression of the spindle, the contacts on arms 54a, 54b engage first, so that the holding electromagnet is actuated to release the holding plate 49 before the contacts on arms 65a, 65b engage and current is supplied to the solenoid 47.

The action of lever 64 on arm 54a results in the contacts on arms 54a, 54b being the first to be engaged and first to be separated in the operation of the switch. Accordingly, as the button 62 is depressed in the operation of the switch, the plate 49 is first removed from a notch 48 in rack 43 and if the button is further depressed, the solenoid 47 is energized immediately after the rack is unlocked and acts to move the rack against the force of spring 45. Accordingly, if the rack is to be moved to the right (Fig. 4), the switch spindle is fully depressed with a quick movement. If the button is then held down, the rack will be drawn to the full limit of its movement to the left. By fully depressing the button and then releasing it, the rack will be advanced in steps. If the switch button is only partly depressed, the rack is unlocked and is then moved to the right by the spring, either to the full limit or by one step, depending on how long the button is held down.

When the rack 43 is at the end of its movement to the right (Fig. 4) with the plate 49 in the notch 48 farthest to the left, the carrier plate is in the position illustrated in Fig. 7 and gear 40 thereon driven by gear 32 meshes with the wide faced gear 19. The gearing is such that, under these conditions, the record sheet is advanced 3" per minute. When the rack is moved one step to the left, the carrier plate is moved to the position illustrated in Fig. 8 in which gear 41 driven by gear 33 is in engagement with gear 19. Under these conditions, the record sheet is advanced at the rate of 12" per minute. When the rack is advanced another step to the left and plate 49 enters notch 48a, none of the gears 40, 41 or 42 on the carrier plate is in engagement with gear 19 and the record sheet is at rest. When the rack is at the extreme left end of its travel, the carrier plate is in the position shown in Fig. 9 in which gear 42 driven by gear 34 is in engagement with gear 19 and, with this arrangement, the record sheet is advanced at the rate of 6" per minute.

In order that an indication may be given at the control station to show whether the tape is at rest or moving and the rate of its movement, a plurality of switches 66a, 66b, 66c and 66d are mounted adjacent the path through which the carrier plate swings. Each switch includes a pair of contact arms, one of which is engageable by a projection 67 on the plate, and as the plate is swung and comes to rest in a particular position, the projection closes one of the switches 66 and establishes a circuit through one or the other of a group of lines 68 by which current from a common supply line 69 is supplied to a lamp at the control station.

In the mechanism illustrated, the gear 17 on shaft 10 drives a gear 70 held against return movement by a spring-pressed pawl 71 and meshing with a gear 72 which, in turn, meshes with a gear 73 on the spindle 16 of the record sheet take-up roll. A pinion 74 is secured to gear 70 and meshes with and drives a gear 75 provided with a cam plate 76 on one face. The cam plate has a projection 77 on its surface and, as the plate rotates, the projection successively engages arms 78, 79 of a pair of switches.

The arm 78 carries a contact engageable with a contact on an arm 80, which is connected in a circuit 81 leading to an electrically actuated counter. Arm 79 carries a contact engageable with a contact on an arm 82 also in the counter circuit. The contacts on arms 78 and 80 are normally closed and those on arms 79 and 82 are normally open. Accordingly, when the projection engages arm 78, it first separates the contacts on arms 78 and 80 and, thereafter, when the projection engages arm 79, it causes engagement of the contacts on that arm and on arm 82. Under these conditions, the circuit of the counter is normally open by reason of the separation of the contacts on arms 79 and 82. When both arms 78 and 79 are in contact with a projection, the counter circuit is open and remains open until arm 78 slips off the projection. At this point, the counter circuit is closed and it remains closed until the projection has passed out from beneath the end of arm 79 when the circuit is again opened. The gearing by which the cam plate 76 is rotated is such that the counter counts each foot of record sheet that has been wound up on the supply roll and thus indicates the supply of the sheet that is still available at any time.

In order that the operator at the control station may know that the instrument is operating satisfactorily, a spring switch arm 84 is mounted adjacent the gear 75 and has an end which bears against the teeth of the gear. Arm 84 has a contact engaging with a contact on an arm 85 and the contacts control a circuit through lines 86 to a light at the control station. When the instrument is in operation, the continued rotation of the gear 75 causes the contacts on arms 84, 85 to open and close at a regular rate and this causes repeated flashings of the signal light. If the light goes out or burns steadily, the operator is informed that the instrument is not working.

In the operation of the instrument equipped with the new change speed mechanism, the motor is controlled by a suitable switch, not shown, and when started into operation, drives the advancing and take-up rolls of the instrument at a rate determined by the gear 40, 41, or 42, which is, at that time, in mesh with gear 19. If the mechanism has been left in a condition in which none of the gears 40, 41, or 42 is in driving engagement with gear 19, the mechanism may be brought into action by manipulation of switch button 62 and full or partial depression of the button by the operator is used to bring the mechanism into action or to change from one speed to another. Whenever such a speed change is made, the first step in the depression of the switch button actuates the holding electromagnet to release the locking plate from rack 43 and as the armature 50 of the electromagnet is drawn down, it engages the crank 28 on fork 26 and swings the fork to move gear 19 away from gear 17, so that the pin 21 in the flange 20 of the hub of the gear is released from one of the openings in gear 17. This causes the record sheet to remain at rest until the electromagnet 53 is deenergized and locking plate 49 enters a notch 48 in the rack. At that time, the armature has released crank 28 and spring 22 has moved the gear 19 toward gear 17 until pin 21 enters another opening in gear 17 and causes the two gears to be connected together.

The disconnection of the speed mechanism from the shaft which it drives is not necessary in all applications of the mechanism, but is desirable when the mechanism is used for driving a recording instrument. The reason is that, if gear 19 were fast on shaft 10 and speeds were changed in a sequence in one direction, the gear would be turned reversely to a slight extent and this would draw back the record sheet, so that there would be an overlapping of recorded lines on the sheet over a short length thereof. By disconnecting the gear 19 on shaft 10 when a speed change is made, such overlapping of recorded lines is avoided and, although there is a loss of recording during the time the change is made, this is unimportant because of the short time interval required to shift from one speed to another.

I claim:

1. In a change speed mechanism for connecting a pair of shafts and including a set of gears on one shaft, a gear on the second shaft, and a plate carrying a set of gears continuously meshing with respective gears of the set on the shaft, the plate being movable to different positions in which different gears thereon are in mesh with the gear on the second shaft, the combination of a member connected to the plate and movable to different positions corresponding to the different positions of the plate, means tending to move the member toward one position, electrically controlled means engaging the member and operable to lock it in each of its several positions, and means operable when said member is unlocked for moving the plate against the action of the first means.

2. In a change speed mechanism for connecting a pair of shafts and including a set of gears on one shaft, a gear on the second shaft, and a plate carrying a set of gears continuously meshing with respective gears of the set on the shaft, the plate being movable to different positions in which different gears thereon are in mesh with the gear on the second shaft, the combination of a member connected to the plate and movable to different positions corresponding to the different positions of the plate, a spring connected to the member and urging it toward one position, means engaging the member for locking it in each of its several positions, and electrically controlled means operable when the member is unlocked for moving the member against the action of the spring.

3. In a change speed mechanism for connecting a pair of shafts and including a set of gears on one shaft, a gear on the second shaft, and a plate carrying a set of gears continuously meshing with respective gears of the set on the shaft, the plate being movable to different positions in which different gears thereon are in mesh with the gear on the second shaft, the combination of a member connected to the plate and movable to different positions corresponding to the different positions of the plate, a spring connected to the member and urging it toward one position, electrically controlled means for locking the member in each of its several positions, and electrically controlled means for moving the member against the action of the spring.

4. In a change speed mechanism for connecting a pair of shafts and including a set of gears on one shaft, a gear on the second shaft, and a plate carrying a set of gears continuously meshing with respective gears of the set on the shaft, the plate being movable to different positions in which different gears thereon are in mesh with the gear on the second shaft, the combination of a member connected to the plate and movable to different positions corresponding to the different positions of the plate, a spring connected to the member and urging it toward one position, electrically controlled means for locking the member in each of its several positions, electrically controlled means for moving the member against the action of the spring, and a switch operable, on partial actuation, to cause the locking means to release the member and, on complete actuation, to maintain the locking means in releasing condition and to cause the moving means to move the member.

5. In a change speed mechanism for connecting a pair of shafts and including a set of gears on one shaft, a gear on the second shaft, and a plate carrying a set of gears continuously meshing with respective gears of the set on the shaft, the plate being mounted for rotary movement on the axis of the first shaft to different positions in which different gears thereon are in mesh with the gear on the second shaft, the plate being provided with a curved set of teeth, the combination of a rack meshing with the teeth on the plate and movable to different positions corresponding to different positions of the plate, means tending to move the rack toward one position, means for locking the rack in each of its several positions, and means for moving the rack against the action of the first means.

6. In a change speed mechanism for connecting a pair of shafts and including a set of gears on one shaft, a gear on the second shaft, and a plate carrying a set of gears continuously meshing with respective gears of the set on the shaft, the plate being mounted for rotary movement on the axis of the first shaft to different positions in which different gears thereon are in mesh with the gear on the second shaft, the plate being provided with a curved set of teeth, the combination of a rack meshing with the teeth on the plate and movable to different positions corresponding to different positions of the plate, a spring urging the rack toward one position, means for locking the rack in each of its several positions, and means for moving the rack against the action of the spring, the locking and moving means being remotely controllable.

7. In a change speed mechanism for connecting a pair of shafts and including a set of gears on one shaft, a gear on the second shaft, and a plate carrying a set of gears continuously meshing with respective gears of the set on the shaft, the plate being mounted for rotary movement on the axis of the first shaft to different positions in which different gears thereon are in mesh with the gear on the second shaft, the plate being provided with a curved set of teeth, the combination of a rack meshing with the teeth on the plate and movable to different positions corresponding to different positions of the plate, a spring urging the rack toward one position, electrically controlled means for locking the rack in each of its several positions, and electrically controlled means for moving the rack against the action of the spring.

8. In a change speed mechanism for connecting a pair of shafts and including a set of gears on one shaft, a gear on the second shaft, and a plate carrying a set of gears continuously meshing with respective gears of the set on the shaft, the plate being mounted for rotary movement on the axis of the first shaft to different positions in which different gears thereon are in mesh with the gear on the second shaft, the plate being provided with a curved set of teeth, the combination of a rack meshing with the teeth on the plate and movable to different positions corresponding to different positions of the plate, a spring urging the rack toward one position, a spring-actuated element for locking the rack in each of its several positions, electrical means for rendering the element ineffective, and electrical means for moving the rack against the force of the spring acting upon it.

9. In a change speed mechanism for connecting a pair of shafts and including a set of gears on one shaft, a gear on the second shaft, and a plate carrying a set of gears continuously meshing with respective gears of the set on the shaft, the plate being mounted for rotary movement on the axis of the first shaft to different positions in which different gears thereon are in mesh with the gear on the second shaft, the plate being provided with a curved set of teeth, the combination of a rack meshing with the teeth on the plate and movable to different positions corresponding to different positions of the plate, a spring urging the rack toward one position, an element for locking the rack in each of its several positions, electrical means for rendering the element ineffective, and remotely controllable means for moving the rack against the action of the spring.

10. In a change speed mechanism for connecting a pair of shafts and including a set of gears on one shaft, a gear on the second shaft, and a plate carrying a set of gears continuously meshing with respective gears of the set on the shaft, the plate being mounted for rotary movement on the axis of the first shaft to different positions in which different gears thereon are in mesh with the gear on the second shaft, the plate being provided with a curved set of teeth, the combination of a rack meshing with the teeth on the plate and movable to different positions corresponding to different positions of the plate, a spring urging the rack toward one position, a spring-actuated element for locking the rack in each of its several positions, solenoid means for rendering the element ineffective, and solenoid means for moving the rack against the force of the spring acting upon it.

11. In a change speed mechanism for connecting a pair of shafts and including a set of gears on one shaft, a gear on the second shaft, and a plate carrying a set of gears continuously meshing with respective gears of the set on the shaft, the plate being mounted for rotary movement on the axis of the first shaft to different positions in which different gears thereon are in mesh with the gear on the second shaft, the plate being provided with a curved set of teeth, the combination of a rack meshing with the teeth on the plate and movable to different positions corresponding to different positions of the plate, a spring urging the rack toward one position, a spring-actuated element for locking the rack in each of its several positions, solenoid means for rendering the element ineffective, solenoid means for moving the rack against the force of the spring acting upon it, and a switch controlling the solenoids and operable to effect energization and deenergization of the solenoids in sequence with the solenoid acting on the locking element energized and deenergized first.

12. In a change speed mechanism for connecting a pair of shafts and including a set of gears on the first shaft, a gear on the second shaft, a clutch for connecting the gear to the second shaft, and a plate carrying a set of gears continuously meshing with respective gears of the set on the shaft, the plate being movable to different positions in which different gears thereon are in mesh with the gear on the second shaft, the combination of a member connected to the plate and movable to different positions corresponding to different positions of the plate, means tending to move the member toward one position, an element locking the member in each of its several positions, means for controlling the clutch, means for rendering the locking element ineffective and simultaneously causing the clutch control means to disengage the clutch, and means operable to move the member, when the locking element is ineffective, against the action of the means tending to move the member toward one position.

ELBIE C. STRONG.